United States Patent
Leytus et al.

(10) Patent No.: US 11,108,472 B1
(45) Date of Patent: Aug. 31, 2021

(54) RADAR WAVEFORM GENERATOR CONFIGURED FOR USE IN WI-FI SYSTEMS TESTING

(71) Applicants: Steven P. Leytus, Redmond, WA (US); Nuri Ariel Rocholl Gullon, Madrid (ES); Zachary S. Leytus, Redmond, WA (US)

(72) Inventors: Steven P. Leytus, Redmond, WA (US); Nuri Ariel Rocholl Gullon, Madrid (ES); Zachary S. Leytus, Redmond, WA (US)

( * ) Notice: Subject to any disclaimer, the term of this patent is extended or adjusted under 35 U.S.C. 154(b) by 0 days.

(21) Appl. No.: 16/783,919

(22) Filed: Feb. 6, 2020

Related U.S. Application Data

(60) Provisional application No. 62/912,325, filed on Oct. 8, 2019.

(51) Int. Cl.
| | | |
|---|---|---|
| H04B 17/00 | (2015.01) | |
| H04B 17/17 | (2015.01) | |
| H04B 17/29 | (2015.01) | |
| H04W 84/12 | (2009.01) | |
| H04B 17/23 | (2015.01) | |
| G01S 7/03 | (2006.01) | |
| G01S 7/40 | (2006.01) | |

(52) U.S. Cl.
CPC .......... *H04B 17/0085* (2013.01); *G01S 7/03* (2013.01); *G01S 7/4017* (2013.01); *H04B 17/17* (2015.01); *H04B 17/23* (2015.01); *H04B 17/29* (2015.01); *H04W 84/12* (2013.01)

(58) Field of Classification Search
CPC .... H04B 17/0085; H04B 17/17; H04B 17/23; H04B 17/29; H04W 84/12; G01S 7/03; G01S 7/4017
See application file for complete search history.

(56) References Cited

U.S. PATENT DOCUMENTS

| | | | |
|---|---|---|---|
| 5,166,691 A | 11/1992 | Chin | |
| 5,786,788 A * | 7/1998 | Schober | ............... G01S 13/288 |
| | | | 342/159 |
| 6,031,483 A * | 2/2000 | Urabe | .................... G01S 7/354 |
| | | | 342/128 |
| 6,639,547 B2 | 10/2003 | Solbach | |
| 8,004,453 B1 * | 8/2011 | Vail | ......................... F41G 7/008 |
| | | | 342/62 |
| 8,839,056 B2 | 9/2014 | Harvey | |
| 9,689,969 B2 | 6/2017 | Lewis | |
| 9,991,933 B2 | 6/2018 | Schmid | |
| 10,015,732 B2 | 7/2018 | Chang | |
| 10,736,114 B2 * | 8/2020 | Dillon | ................. H04W 72/082 |

(Continued)

FOREIGN PATENT DOCUMENTS

| | | |
|---|---|---|
| CN | 103929257 A | 7/2014 |
| CN | 103929258 A | 7/2014 |

(Continued)

OTHER PUBLICATIONS

Chi, Brian, DFS (Dynamic Frequency Selection)Introduction and Test Solution, Keysight Technologies, Sep. 21, 2015.

*Primary Examiner* — Dominic E Rego
(74) *Attorney, Agent, or Firm* — Timothy E. Siegel Patent Law, PLLC; Timothy E. Siegel

(57) ABSTRACT

A radar waveform generator, having a radar waveform selection assembly, permitting a user to select a waveform by picking any one out of a set of less than 50 center frequencies named in a 5 GHz Wi-Fi standard and any one out of a set of less than 10 pulse repetition waveforms. Further, the radar waveform generator has an electronic network producing and emits the selected radar waveform.

10 Claims, 3 Drawing Sheets

(56) References Cited

U.S. PATENT DOCUMENTS

| | | | |
|---|---|---|---|
| 2004/0203828 A1* | 10/2004 | Mirchandani | H04W 28/26 |
| | | | 455/452.1 |
| 2008/0048669 A1* | 2/2008 | Scherber | G01S 13/89 |
| | | | 324/534 |
| 2008/0136704 A1* | 6/2008 | Chan | G01S 13/24 |
| | | | 342/201 |
| 2009/0051584 A1* | 2/2009 | Hellsten | G01S 13/9054 |
| | | | 342/25 A |
| 2009/0160696 A1 | 6/2009 | Pare | |
| 2011/0215962 A1* | 9/2011 | Culkin | G01S 13/426 |
| | | | 342/99 |
| 2012/0306687 A1* | 12/2012 | Matsuo | G01S 13/284 |
| | | | 342/189 |
| 2013/0099959 A1* | 4/2013 | Matsuo | G01S 7/282 |
| | | | 342/189 |
| 2014/0038528 A1 | 2/2014 | Harvey | |
| 2015/0042506 A1* | 2/2015 | Busuioc | G01S 7/032 |
| | | | 342/70 |
| 2015/0084811 A1* | 3/2015 | Mazzaro | G01S 13/87 |
| | | | 342/176 |
| 2017/0086256 A1* | 3/2017 | Chen | H04W 84/14 |
| 2018/0338187 A1 | 11/2018 | Ketonen | |
| 2020/0166625 A1* | 5/2020 | Koubiadis | G01S 7/2921 |
| 2020/0217951 A1* | 7/2020 | Park | G01S 13/343 |

FOREIGN PATENT DOCUMENTS

| | | |
|---|---|---|
| CN | 109788112 A | 5/2019 |
| CN | 208999560 U | 6/2019 |

\* cited by examiner

RADAR WAVEFORM GENERATOR CONFIGURED FOR USE IN WI-FI SYSTEMS TESTING

RELATED APPLICATIONS

This application claims benefit of provisional application U.S. Ser. No. 62/912,325 filed Oct. 8, 2019, which is incorporated by reference as if fully set forth herein.

BACKGROUND OF THE INVENTION

The 5 GHz Wi-Fi system standard, in the United States and some other countries, requires that the system constantly look for radar signals in the frequencies used, and if a radar signal is found, hop onto another frequency that will not interfere with the radar. Accordingly, Wi-Fi systems are designed to perform these functions.

A Wi-Fi technician building a Wi-Fi system for a business, for example a hotel or conference center, may use equipment from a few different manufacturers. The consequence of the detection of a radar signal can be quite unpredictable in this situation, as it may be that different equipment attempts to hop to the same channel as other equipment. In the worst scenario, the detection of a radar signal can cause the entire system to crash, causing end users to be inconvenienced and the Wi-Fi technician to receive an emergency call, and a certain amount of customer dissatisfaction.

Accordingly, there is a need for equipment that can produce the signals that are required to be detected by the relevant regulations, to permit Wi-Fi technicians to test the response of a Wi-Fi system to a signal of this type. Such equipment exists in the form of signal generators—devices constructed to produce a wide variety of signals. Unfortunately, however, such systems may be too expensive for the average Wi-Fi technician, and bulky to carry from job to job. Also, test setup is not optimized for producing radar simulated waveforms in the Wi-Fi channels. As a result, many Wi-Fi technicians go without and risk system failure if a radar signal is detected by the system the technician has configured.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a radar simulator, which is adapted to produce any one out of a set of target signals, each mimicking a radar signal, and having a mass-produced phase-locked loop (PLL) chip, having a digital input and a radio frequency (RF) output and capable of producing a signal having a frequency up to at least 5.9 GHz at the output; a mass-produced power amplifier chip having a digital input, an RF input and an RF output; a mass-produced bandpass filter chip mass-produced by a semiconductor manufacturing process and having an RF input and an RF output; a mass-produced micro-controller chip having outputs connected to the digital input of the PLL chip and the power amplifier chip; an input and display assembly, digitally connected to the micro-controller chip; an RF antenna. A first communications pathway joins the RF output of the PLL chip to the RF input of the power amplifier chip and a second communications pathway, joining the RF output of the power amplifier chip to the RF input of the bandpass filter chip. Further, a third communications pathway, joins the RF output of the power amplifier chip to the RF antenna. Finally, the digital controller chip is programmed to control the PLL chip to produce a continuous RF signal of the target signal, and to control the power amplifier chip to selectively amplify the continuous RF signal into a pulsed RF signal, having a pulse repetition frequency of the target signal.

In a second separate aspect, the present invention may take the form of a radar waveform generator, having a radar waveform selection assembly, permitting a user to select a waveform by picking any one out of a set of less than 50 center frequencies named in a 5 GHz Wi-Fi standard and any one out of a set of less than 10 pulse repetition waveforms. The radar waveform generator further has an electronic network producing and emits the selected radar waveform.

In a third separate aspect, the present invention may take the form of a method of testing a Wi-Fi access point, that utilizes a radar waveform generator and a computer system equipped with a Wi-Fi transceiver and packet analysis software. In the method, the computer system is used to determine on which channel the access point is currently transmitting. Then, this channel and a pulse repetition interval and pulse width are selected on the radar waveform generator and the generator is commanded to emit a signal, at the selected channel, pulse repetition interval and pulse width, and the computer system is used to determine if the access point has jumped to a different channel.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced drawings. It is intended that the embodiments and figures disclosed herein are to be considered illustrative rather than restrictive.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definition: A chip that is mass-produced is a chip produced with photolithography in one stage of production, and that is produced in such vast quantity that the price per unit is less than $20, as of Oct. 1, 2019, or the equivalent, as adjusted by the Consumer Price Index, published by the Bureau of Labor Statistics of the US Government, at any time post that date. It will be noted that the costs of producing semiconductor chips lies largely in the production of complex masks that are used to manufacture the chips. Because of the fixed costs of designing the masks, a great many chips must be produced (e.g. over 100,000) to spread that expense out among many units, thereby permitting sales of the chips at a low price. In the alternative a chip that is mass-produced is a chip produced with photolithography in one stage of production and that has sold over 100,000 units. In an alternative definition, a chip that is mass-produced is a chip for which the layout of each layer is unique to that chip (not considering others in the same series, from the same manufacturer). That is to say, gate array ASICS and FPGAs would not be considered to be "mass-produced." If any one of these three conditions are met, the chip is considered to be mass-produced.

The genius of the invention disclosed and claimed herein is that a special purpose radar simulator can be produced and provided to the public at a low cost, by using mass-produced chips, generally made for the production of Wi-Fi equipment that is sold in the millions of units. These mass-produced chips are herein set to a distinct use of a device for testing Wi-Fi equipment, that otherwise would be financially out of reach for many Wi-Fi technicians.

Figure 1:
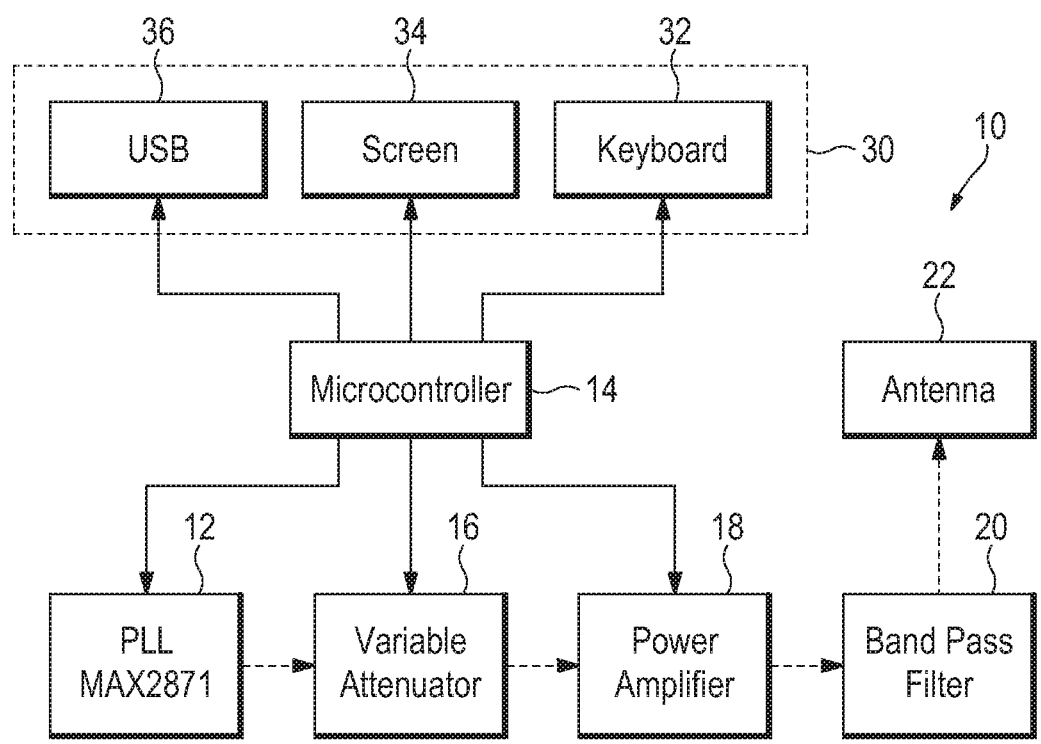
FIG. 1 is a block diagram of a radar simulator, according to the present invention.

Referring to FIG. 1, a radar simulator 10, includes a phase locked loop (PLL) chip 12 that produces an RF signal as commanded by a micro-controller chip 14, this RF signal is conveyed to a variable attenuator chip 16, by a communications pathway in the form of a waveguide. In turn, attenuator chip 16 is connected by waveguide to a power amplifier chip 18, which is connected by waveguide to a bandpass filter chip 20, which in turn is connected by waveguide to an RF antenna 22.

Variable attenuator chip 16 is controlled by a micro-controller chip 14 to either attenuate the signal from the PLL chip 12, or to not attenuate or attenuate to a much lesser degree this signal. This creates a long-range mode of simulator 10, when the attenuator 16 is commanded to not attenuate or to attenuate to a lesser degree, and a short-range mode where the attenuator 16 is commanded to attenuate more than in the long-range mode. In some embodiments, attenuator chip 16 is not included so that PLL chip 12 is connected by waveguide directly to the power amplifier chip 18, and there are not two different modes for permitting different ranges to the Wi-Fi equipment being tested. In yet another embodiment, differing range modes are implemented using only a power amplifier chip 18.

An input and display module 30, includes a keyboard 32, a screen 34, and a USB connector 36. In one embodiment, simulator 10 is a hand-held device and screen 34 is a liquid crystal display screen, adapted for displaying a few elements of basic information, and keyboard 32 includes less than 15 keys. This embodiment, however, includes USB connector 36, in the form of either a socket or a jack, permitting connection to a laptop computer, or another type of computer. In one embodiment, simulator 10 is provided in tandem with a computer software package for facilitating control of simulator 10, from a laptop or similar device. In yet another embodiment, simulator 10 is combined with other elements providing other features, for example features adapted to analyze Wi-Fi signals. In these embodiments, micro-controller chip 14 may be a digital signal processing chip, that includes output pins that can be used to control chips 12, 16 and 18. In various combinations of features and components, an RF switch may be provided prior to the antenna, so that antenna use may be switched between various functions by the micro-controller chip 14.

In embodiments, micro-controller chip 14 either includes or can access computer readable memory that is programmed to cause the micro-controller chip 14 to control chips 12, 16 and 18 to produce a sequence of signals. In one embodiment this sequence of signals reflects the requirements for radar signals to which Wi-Fi systems are required to respond.

In an alternative embodiment, variable attenuator chip 16 is not included, so that simulator 10 has only one range mode, and the signal from PLL chip 12 is carried by a waveguide directly to a power amplifier chip 18. In either embodiment, amplifier chip 18 breaks its received signal into pulses by selectively amplifying over time, as commanded by micro-controller chip 14. This creates the pulsed RF signal characteristic of radar, at the radio frequencies and pulse repetition frequencies, that Wi-Fi equipment is required to avoid, when detected.

Bandpass filter chip 20 removes the high and low frequency components of the signal received from amplifier chip 18, leaving the signal in the band that corresponds to the frequency of 5 GHz Wi-Fi signals. In the time domain, the pulses created by amplifier chip 18 are rounded at the edges by filter chip 20. Finally, the signal from filter chip 20 is broadcast from antenna 22.

In a preferred embodiment, PLL chip 12 is a Maxim MAX2871 available from Maxim Integrated Products, Inc., which maintains a website at maximintegrated.com. This type of chip typically includes a voltage-controlled oscillator (VCO), and in some embodiments PLL chip 12 is replaced by a VCO chip 12. The Maxim MAX2871 is capable of producing a signal from 23.5 MHz to 6 GHz. Chip 12 creates an output frequency proportional to a voltage received on a designated input pin. Variable attenuator chip 16 may be a Qorvo RFSA3713 available from Qorvo, Inc., which maintains a website at qorvo.com.

In a preferred embodiment, power amplifier chip 18 is a high speed 5 GHz switchable power amplifier, specifically a Skyworks SKY85402-11, available from Skyworks Solutions, Inc., which maintains a website at skyworksinc.com. Bandpass filter chip 20 may be a 5515LP15A730, available from Johanson Technology, which maintains a website at johansontechnology.com.

Figure 2:
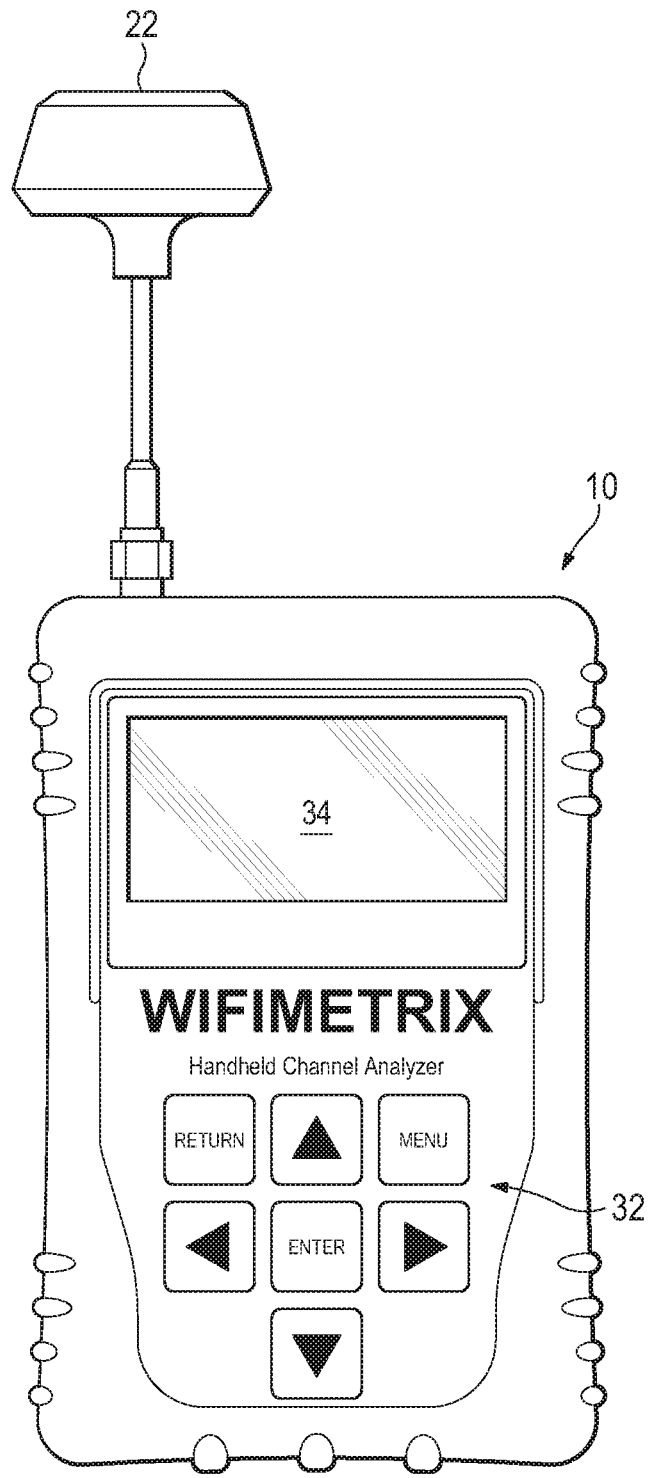
FIG. 2 is a front view of a physical embodiment of a radar simulator, according to the present invention.
Figure 3:
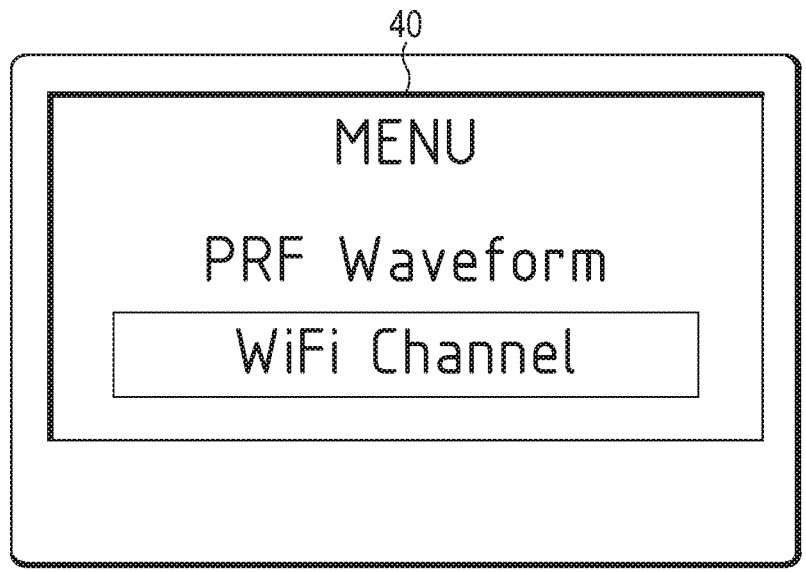
FIG. 3 is an illustration of a menu display that appears on the screen of the radar simulator of FIG. 2.
Figure 4:
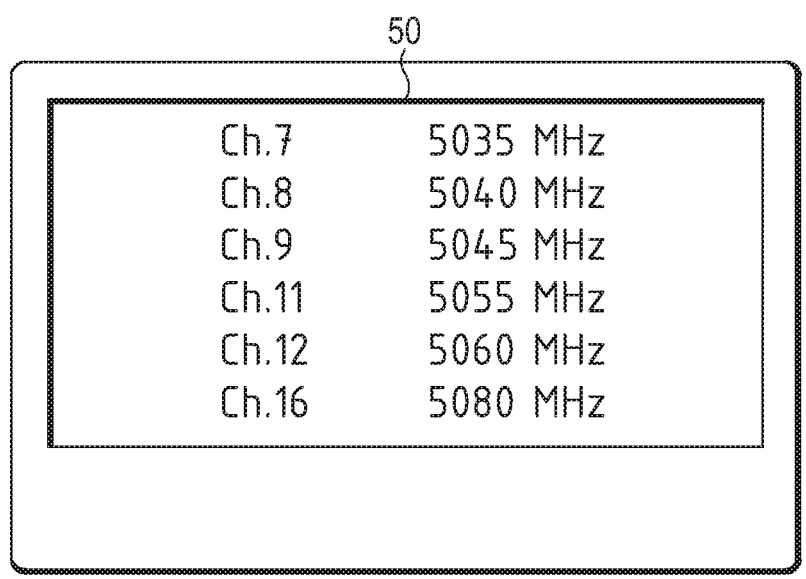
FIG. 4 is an illustration of a channel selection display that appears on the screen of the radar simulator of FIG. 2.

Referring now to FIGS. 2-4, in one preferred embodiment, the radar simulator 10 may take the physical form of a handheld device as shown in FIG. 2, being roughly 6 cm wide by 10 cm high, or about the right size to easily fit into the palm of an averaged sized person. RF antenna 22, keyboard 32 and screen 34 appear in physical form, as part of simulator 10. A menu key permits a user to cause the screen to display a menu 40 as shown in FIG. 3. This permits a user to use the arrow keys to select a channel menu 50 for the selection of a channel with a listed center frequency (as shown in FIG. 4), or a PRF selection screen (not shown) where the user selects a pulse repetition interval and pulse width (in microseconds). The effect of this configuration is that a user may easily set up a test of the radar detection and channel hopping ability of a Wi-Fi configuration, using an easily portable handheld device. Although the user is not enabled to produce the broad range of signal waveforms possible with the use of a signal generator, simulator 10 provides the Wi-Fi technician assessing a Wi-Fi system response to a radar signal with the signal forms that he needs to perform these tests, and provides him or her with an easy way of selecting a desired waveform from the limited number of test waveforms that are needed to do this testing.

In embodiments, simulator 10 has a mass of less than 600 grams, is less than 400 cubic centimeters in volume, has a length of less than 15 cm, has a width of less than 10 cm and/or has a thickness of less than 2 cm. In a further embodiment simulator 10 has a mass of less than 500 grams.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of testing a Wi-Fi access point, comprising:
   a) providing a radar waveform generator and a computer system equipped with a Wi-Fi transceiver and packet analysis software;
   b) using the computer system to determine on which channel said access point is currently transmitting;
   c) selecting said channel on said radar waveform generator;
   d) selecting a pulse repetition waveform on said radar waveform generator and commanding said generator to emit a signal at said selected channel and pulse repetition waveform;
   e) using said computer system to determine if said access point has jumped to a different channel.

2. The method of claim 1, wherein if said access point has jumped to a different channel, said packet analysis software is used to determine if a correct sequence of packets was sent, prior to said jump.

3. The method of claim 1, wherein if said access point has not jumped to a different channel, a different pulse repetition waveform is selected on said radar waveform generator, and said generator is again commanded to emit a signal at said selected channel and pulse repetition waveform and said computer system is again used to determine if said access point has jumped to a different channel.

4. The method of claim 1, wherein if said access point has not jumped to a different channel said radar waveform generator automatically selects a second pulse repetition waveform and emits at said channel and said second pulse repetition waveform.

5. The method of claim 4, wherein if said access point has not jumped to a different channel said radar waveform generator automatically selects a third pulse repetition waveform and emits at said channel and said third pulse repetition waveform.

6. The method of claim 4, wherein said radar waveform generator continues to select new pulse repetition frequencies, until either said access point jumps to a different channel, or all said pulse repetition waveforms have been emitted.

7. The method of claim 1, wherein said radar waveform generator permits a user to select a waveform by picking any one out of a set of less than 50 center frequencies named in a 5 GHz Wi-Fi standard and any one out of a set of pulse repetition waveforms and wherein said step of selecting said channel includes selecting any on out of said set of less than 50 center frequencies.

8. The method of claim 7, wherein said set of pulse repetition waveforms includes less than 10 pulse repetition waveforms and said step of selecting a pulse repetition waveform includes selecting a pulse repetition waveform from said set of pulse repetition waveforms.

9. The method of claim 7, wherein said waveform generator includes a selection assembly that includes a user input and a display screen, which displays a drop-down menu for said center frequencies when commanded to do so by said user input and, wherein said step of selecting a channel on said radar waveform generator includes using said drop-down menu to select one of said center frequencies.

10. The method of claim 1, wherein said radar waveform generator weighs less than 600 grams and wherein said step of selecting said channel includes a user holding said radar waveform generator in a first hand and using a second hand to select said channel.

* * * * *